(12) United States Patent
Hunt et al.

(10) Patent No.: US 7,882,162 B2
(45) Date of Patent: Feb. 1, 2011

(54) RAPID ACCESS TO DATA ON A POWERED DOWN PERSONAL COMPUTER

(75) Inventors: Peter D. Hunt, Spring, TX (US); Pablo Salazar, Spring, TX (US); Valiuddin Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 912 days.

(21) Appl. No.: 10/214,668

(22) Filed: Aug. 8, 2002

(65) Prior Publication Data

US 2004/0030878 A1 Feb. 12, 2004

(51) Int. Cl.
*G06F 12/00* (2006.01)
*G06F 17/30* (2006.01)
*G06F 1/26* (2006.01)
*G06F 1/32* (2006.01)

(52) U.S. Cl. .................. 707/899; 707/782; 707/788; 713/320

(58) Field of Classification Search .............. 707/104.1; 713/1, 300, 2, 312; 348/143; 718/1
See application file for complete search history.

(56) References Cited

U.S. PATENT DOCUMENTS

| | | | |
|---|---|---|---|
| 4,542,377 A | 9/1985 | Hagen et al. | |
| 4,831,368 A | 5/1989 | Masimo et al. | |
| 5,134,390 A | 7/1992 | Kishimoto et al. | |
| 5,173,940 A | 12/1992 | Lantz et al. | |
| D343,168 S | 1/1994 | Morisaki et al. | |
| 5,329,289 A | 7/1994 | Sakamoto et al. | |
| 5,337,212 A | 8/1994 | Bartlett et al. | |
| 5,436,792 A | 7/1995 | Leman et al. | |
| 5,535,093 A | 7/1996 | Noguchi et al. | |
| 5,537,531 A | 7/1996 | Suga et al. | |
| 5,596,697 A | 1/1997 | Foster et al. | |
| 5,640,176 A | 6/1997 | Mundt et al. | |
| 5,682,529 A | 10/1997 | Hendry et al. | |
| 5,708,458 A | 1/1998 | Vrbanac | |
| 5,708,561 A | 1/1998 | Huilgol et al. | |
| 5,774,233 A | 6/1998 | Sakamoto | |
| 5,790,120 A | 8/1998 | Lozares et al. | |
| 5,841,424 A | 11/1998 | Kikinis | |
| 5,845,282 A * | 12/1998 | Alley et al. .................. 707/10 |
| 5,859,628 A | 1/1999 | Ross et al. | |
| 5,889,964 A | 3/1999 | Cho et al. | |
| 5,899,421 A | 5/1999 | Silverman | |
| 5,903,254 A | 5/1999 | Mundt et al. | |
| 5,923,528 A | 7/1999 | Lee | |

(Continued)

OTHER PUBLICATIONS

Office Action, Date Mailed Sep. 30, 2004, U.S. Appl. No. 10/214,827, pp. 7.

(Continued)

*Primary Examiner*—Susan Y Chen

(57) ABSTRACT

The disclosed embodiments provide rapid access to information stored on a personal computing device even though the personal computing device is powered off or otherwise in a low-power consumption state such as a sleep state or hibernation state. An software component gathers user data in a location such as a non-volatile memory associated with a host computer. A browser component accesses the stored data and makes it available to the user when the host computer is powered down or otherwise in a state of low power consumption.

25 Claims, 4 Drawing Sheets

U.S. PATENT DOCUMENTS

| | | | |
|---|---|---|---|
| 5,941,493 | A | 8/1999 | Cheng |
| 5,973,664 | A | 10/1999 | Badger et al. |
| 5,991,897 | A | 11/1999 | Perugini et al. |
| 5,995,139 | A * | 11/1999 | Lee ............................ 348/143 |
| 6,061,104 | A | 5/2000 | Evanicky et al. |
| 6,125,449 | A | 9/2000 | Taylor et al. ................. 713/310 |
| 6,137,468 | A | 10/2000 | Martinez et al. |
| 6,157,958 | A | 12/2000 | Armitage et al. |
| 6,189,842 | B1 | 2/2001 | Bergeron Gull et al. |
| 6,189,850 | B1 | 2/2001 | Liao et al. |
| 6,208,996 | B1 * | 3/2001 | Ben-Shachar et al. .... 707/104.1 |
| 6,209,088 | B1 * | 3/2001 | Reneris ......................... 713/1 |
| 6,268,845 | B1 | 7/2001 | Pariza et al. ................. 345/112 |
| 6,275,932 | B1 | 8/2001 | Yamaguchi et al. |
| 6,289,466 | B1 | 9/2001 | Bayramoglu et al. ........ 713/310 |
| 6,301,101 | B1 | 10/2001 | Anzai et al. |
| 6,326,978 | B1 | 12/2001 | Robbins |
| 6,331,867 | B1 | 12/2001 | Eberhard et al. |
| 6,336,142 | B1 * | 1/2002 | Kato et al. ................... 709/227 |
| 6,343,006 | B1 | 1/2002 | Moscovitch et al. |
| 6,366,450 | B1 | 4/2002 | Janicek |
| 6,385,668 | B1 | 5/2002 | Gaddess et al. |
| 6,418,010 | B1 | 7/2002 | Sawyer |
| 6,426,872 | B1 | 7/2002 | Sutton et al. |
| 6,437,975 | B1 | 8/2002 | Huang |
| 6,443,408 | B1 | 9/2002 | Hung |
| 6,477,588 | B1 | 11/2002 | Yerazunis et al. |
| D469,091 | S | 1/2003 | Hasegawa et al. |
| 6,504,710 | B2 | 1/2003 | Sutton et al. |
| 6,522,529 | B1 | 2/2003 | Huilgol et al. |
| 6,523,125 | B1 * | 2/2003 | Kohno et al. ................. 713/320 |
| 6,567,101 | B1 | 5/2003 | Thomas |
| 6,583,984 | B2 | 6/2003 | Yin et al. |
| 6,633,976 | B1 * | 10/2003 | Stevens ........................ 713/2 |
| 6,639,788 | B1 | 10/2003 | Liao et al. |
| 6,691,187 | B1 | 2/2004 | Schwerin |
| 6,727,830 | B2 | 4/2004 | Lui et al. |
| 6,763,458 | B1 * | 7/2004 | Watanabe et al. ............ 713/100 |
| 6,771,494 | B2 | 8/2004 | Shimano |
| 6,781,604 | B2 | 8/2004 | Poynter |
| 6,788,527 | B2 | 9/2004 | Doczy et al. |
| 6,795,966 | B1 * | 9/2004 | Lim et al. ...................... 718/1 |
| 6,856,506 | B2 | 2/2005 | Doherty et al. |
| 6,874,744 | B2 | 4/2005 | Rawlings et al. |
| 6,888,532 | B2 | 5/2005 | Wong et al. |
| 6,895,515 | B1 * | 5/2005 | Yamazaki ................... 713/300 |
| 7,025,274 | B2 | 4/2006 | Solomon et al. |
| 7,089,487 | B2 | 8/2006 | Tsai |
| 7,209,124 | B2 | 4/2007 | Hunt et al. |
| 7,542,052 | B2 | 6/2009 | Solomon et al. |
| 2001/0011302 | A1 | 8/2001 | Son |
| 2001/0025289 | A1 | 9/2001 | Jenkins et al. |
| 2002/0024499 | A1 | 2/2002 | Karidis et al. |
| 2002/0068558 | A1 | 6/2002 | Janik |
| 2002/0130836 | A1 | 9/2002 | Ohmori et al. |
| 2002/0135977 | A1 | 9/2002 | Yin et al. |
| 2002/0184395 | A1 | 12/2002 | LeFevre et al. |
| 2003/0122882 | A1 | 7/2003 | Kho |
| 2003/0162152 | A1 | 8/2003 | Lee |
| 2003/0222848 | A1 | 12/2003 | Solomon et al. |
| 2003/0234797 | A1 | 12/2003 | Williams et al. |
| 2003/0236935 | A1 | 12/2003 | Amemiya et al. |
| 2003/0236971 | A1 | 12/2003 | Rothman et al. |
| 2004/0017652 | A1 | 1/2004 | Billington et al. |
| 2004/0021678 | A1 | 2/2004 | Ullah et al. |
| 2004/0047505 | A1 | 3/2004 | Ghassabian |
| 2004/0051726 | A1 | 3/2004 | Martyn |

OTHER PUBLICATIONS

Office Action, Date Mailed Apr. 5, 2006, U.S. Appl. No. 10/214,827, pp. 8.
Final Action, Date Mailed Oct. 10, 2006, U.S. Appl. No. 10/214,827, pp. 9.
Notice of Allowability, Date Mailed Dec. 19, 2006, U.S. Appl. No. 10/214,827, pp. 4.
Office Action, Date Mailed Jul. 12, 2005, U.S. Appl. No. 10/214,818, pp. 16.
Final Action, Date Mailed Jan. 11, 2006, U.S. Appl. No. 10/214,818, pp. 20.
Office Action, Date Mailed Jun. 30, 2006, U.S. Appl. No. 10/214,818, pp. 19.
Final Action, Date Mailed Dec. 22, 2006, U.S. Appl. No. 10/214,818, pp. 15.
Advisory Action, Date Mailed Mar. 5, 2007, U.S. Appl. No. 10/214,818, pp. 6.
Panel Decision from Pre-Appeal Brief Review, Date Mailed Jul. 6, 2007, U.S. Appl. No. 10/214,818, pp. 2.
Final Action, Date Mailed Jul. 10, 2008, U.S. Appl. No. 10/214,818, pp. 9.
Office Action, Date Mailed Feb. 1, 2008, U.S. Appl. No. 10/214,818, pp. 13.
Notice of Allowability, Date Mailed Jan. 27, 2009, U.S. Appl. No. 10/214,818, pp. 4.
Office Action, Date Mailed Jun. 4, 2009, U.S. Appl. No. 10/214,818, pp. 11.
Notice of Allowability, Date Mailed Nov. 23, 2009, U.S. Appl. No. 10/214,818, pp. 4.
Office Action, Date Mailed Oct. 17, 2005, U.S. Appl. No. 10/215,416, pp. 19.
Office Action, Date Mailed Apr. 3, 2006, U.S. Appl. No. 10/215,416, pp. 17.
Office Action, Date Mailed Mar. 30, 2004, U.S. Appl. No. 10/159,658, pp. 12.
Final Action, Date Mailed Oct. 6, 2004, U.S. Appl. No. 10/159,658, pp. 15.
Final Action, Date Mailed Mar. 14, 2005, U.S. Appl. No. 10/159,658, pp. 19.
Office Action, Data Mailed Sep. 21, 2005, U.S. Appl. No. 10/159,658, pp. 10.
Office Action, Date Mailed May 3, 2006, U.S. Appl. No. 10/159,658, pp. 14.
Final Action, Date Mailed Oct. 17, 2006, U.S. Appl. No. 10/159,658, pp. 16.
Office Action, Date Mailed Jul. 13, 2007, U.S. Appl. No. 10/159,658, pp. 13.
Final Action, Date Mailed Jan. 24, 2008, U.S. Appl. No. 10/159,658, pp. 13.
Advisory Action, Date Mailed Mar. 18, 2008, U.S. Appl. No. 10/159,658, pp. 3.
Office Action, Date Mailed Jun. 11, 2008, U.S. Appl. No. 10/159,658, pp. 12.
Notice of Allowability, Date Mailed Dec. 30, 2008, U.S. Appl. No. 10/159,658, pp. 7.
One-Click Mobility C lie nt Overview, Mar. 8, 2002, 2002- Pocket Presence AB, pp. 11.
Compaq, Aero 1500/2100 Pocket PC Reference Guide, Mar. 2000, pp. 41.
USPTO Office Action, date mailed Apr. 7, 2010, U.S. Appl. No. 10/214,818, p. 21.
USPTO Office Action, date mailed Apr. 27, 2010, U.S. Appl. No. 12/356,655, p. 30.

* cited by examiner

RAPID ACCESS TO DATA ON A POWERED DOWN PERSONAL COMPUTER

BACKGROUND OF THE INVENTION

1. Field of the Invention

This invention relates generally to providing increased data accessibility for a personal computing device and, more particularly, to a method and apparatus for allowing rapid access to certain data on a personal computing device that is powered down or otherwise in a power conservation state.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to becoming more powerful, computers have also become more mobile than ever before over the past few years. Notebook or laptop PCs have been steadily increasing in power while their cases (or footprint) continue to get lighter and more portable.

Another innovation in recent years has been the handheld PC. These ultra-small PCs have revolutionized productivity because they are highly mobile and provide such functions as wireless email connectivity and even internet browsing. Many handheld PCs are operated or controlled by a stylus or pen instead of a keyboard. In spite of these benefits, handheld PCs are not generally as powerful as their full-function desktop or notebook counterparts. Design considerations such as overall size, weight and heat dissipation prevent the use of the most powerful components (microprocessors, for example) in handheld PCs. These same design considerations prevent the use of large amounts of computer memory and other types of storage such as disk drives.

The tablet PC is an emerging type of personal computing device that is designed to incorporate the power of traditional desktop or notebook computers while offering many of the portability and simplicity features available in handheld PCs. For example, tablet PCs may incorporate a full-function processor and a full-function operating system such as Windows XP Professional, which is available from Microsoft Corporation of Redmond, Wash. In addition, tablet PCs may incorporate advanced video graphics capabilities and large hard drive storage capacity. Tablet PCs may additionally incorporate these powerful features while providing the user with the natural simplicity of a pen- or stylus-based interface, such as the interface typically found on a handheld PC. The combination of power and simplicity afforded by tablet PCs will allow support of handwriting recognition, which will make it possible for users to take handwritten notes, create drawings or annotate documents then wirelessly share the information with others.

Advances in computer technology, however, have not come without undesirable side effects. Modern computers are complex machines and they take a significant amount of time to become usable when they are first turned on. This is because most systems go through a power-on self test and various degrees of hardware and software initialization before they are ready for normal operation. Additional factors that may delay the start of normal operation at power-up or awakening from a reduced power state are: (1) BIOS startup, (2) waiting for a network interface card to initialize, including expiration of any timeouts associated with connecting to a network that is not present or providing a weak signal, and (3) hard drive spin-up.

The factors listed above are in addition to other factors such as the speed of a computer's processor (slower processor will result in slower execution of startup code) or the version and type of operating system being run on the computer (every Os has it's own set of initialization requirements that it must perform, such as enumerating Plug and Play devices, etc). Thus, the power-on initialization process may take over one or two minutes before the computer is ready for a user to launch an application program to obtain desired data. After that, the user must still launch the desired application and request access to the needed data. The time before the user actually gets the desired data may be even longer if the computer must connect to a network to access needed data.

The problem of slow data availability is compounded by the fact that modern computers are capable of being placed into a number of low-power consumption states. This feature is especially useful for handheld, notebook and tablet PCs that are capable of running on batteries. The ability to place these types of computers in power saving states contributes to longer periods between recharging the batteries. An industry standard specification known as the Advanced Configuration and Power Interface ("ACPI") sets forth definitions and requirements for certain low-power states of computer operation. The ACPI specification defines a hibernation state, which the specification refers to by the designation "S4"). The "off" state is referred to in the ACPI specification by the designation "S5."

In many cases, users of computers need faster access to data when they first power up their computers. A business user may need to quickly obtain the location of a meeting or a business associate's phone number or address. When data is needed expeditiously, the initial delay of a computer powering up can be a significant inconvenience. A method and apparatus of rapidly obtaining information from a computer that is powered down or otherwise in a low-power state is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
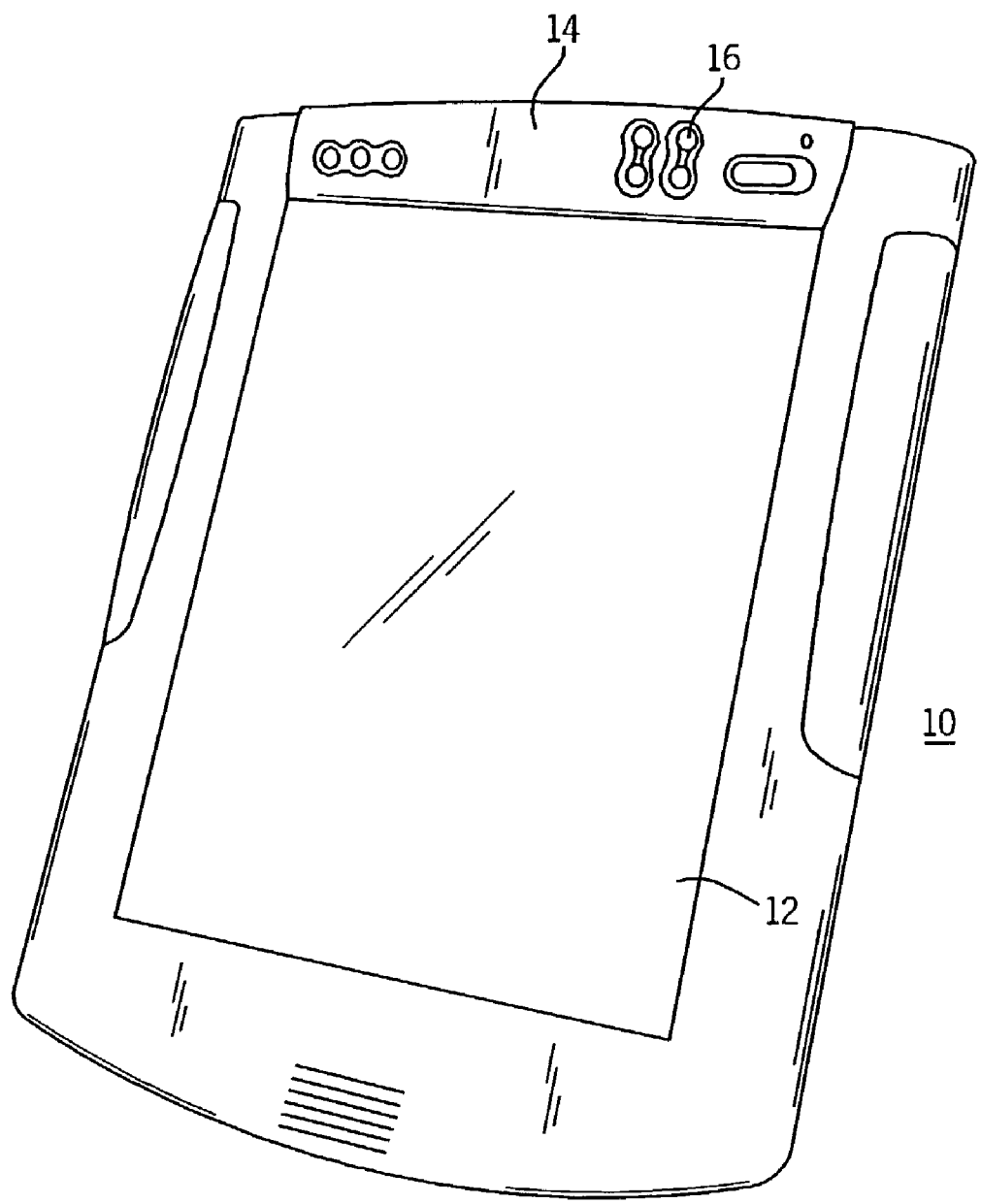
FIG. 1 is a perspective view showing the front of a tablet personal computing device.

Referring to the drawings, FIG. 1 is a perspective view showing the front of a tablet personal computing device. The tablet PC is referred to generally by the reference numeral 10. A full-function processor and a full-function operating system, such as Windows XP (available from Microsoft Corporation of Redmond, Wash.) may be included in the tablet PC 10. In addition, the tablet PC 10 may include sophisticated graphics capability, a large amount of RAM and a large hard drive.

A video display screen 12 extends to cover a significant portion of the front of the tablet PC 10. In the illustrated embodiment, the video display 12 is touch-sensitive to facilitate handwriting recognition. The tablet PC 10 may include application software which supports handwriting recognition.

The tablet PC 10 and control panel 14, which may include an on-off switch and other control buttons. In addition, the control panel 14 is provided with a plurality of soft keys 16. The soft keys 16 may be programmed to support a wide variety of functions of the tablet PC 10. For example, the soft keys 16 may be programmed to allow a user to change the display mode of the tablet PC 10 or to access menus or other features associated with the operation of the tablet PC 10. As described below, the soft keys 16 may be programmed to allow rapid access to a user's data even though the tablet PC 10 is powered off or otherwise in a state of low power consumption such as a hibernation mode.

Email programs and other programs that allow users to manage their personal information, such as task lists, calendar data and contact information for customers and other colleagues or friends, are commonly used on traditional PCs and tablet PCs. Microsoft Outlook, which is available from Microsoft Corporation of Redmond, Wash., is an example of one such email program. Outlook features a task manager, a contact list, a calendar, as well as email and other functions. Generally speaking, Outlook is a type of a program referred to as a Personal Information Manager (or "PIM"). PIM programs primarily display relevant aspects of a user's personal information. For example, PIM programs may be used to view the user's calendar, task list, contact information or email among other data. Examples of such data that a user could get using the PIM include the time and location of an appointment or the telephone number or address of a business colleague. Through the rest of this document, although the examples cite references to Outlook, they are equally valid for other popular PIM applications such Lotus Notes, ACT and the like.

As set forth above, accessing this information typically requires a user to fully boot his PC from an "off" state (ACPI state S5) and launch Outlook (or any other PIM application) to gain access to the relevant PIM information. On a computing device using Windows XP which is also part of a business domain, the boot up or wakeup from hibernation process might also require the user to login (or revalidate) his credentials for authentication from the business information technology ("IT") department to gain access to mail, etc. This process can take a relatively long time, especially if the user is running late or otherwise is in a hurry. Even if Outlook is left running when the user places the PC in a state of low power consumption, such as a hibernation state (ACPI state S4), it may take a considerable amount of time to gain access to information because outlook typically waits for the expiration of network connection timeouts when awakening from a state of low power consumption before displaying information to the user.

Figure 2:
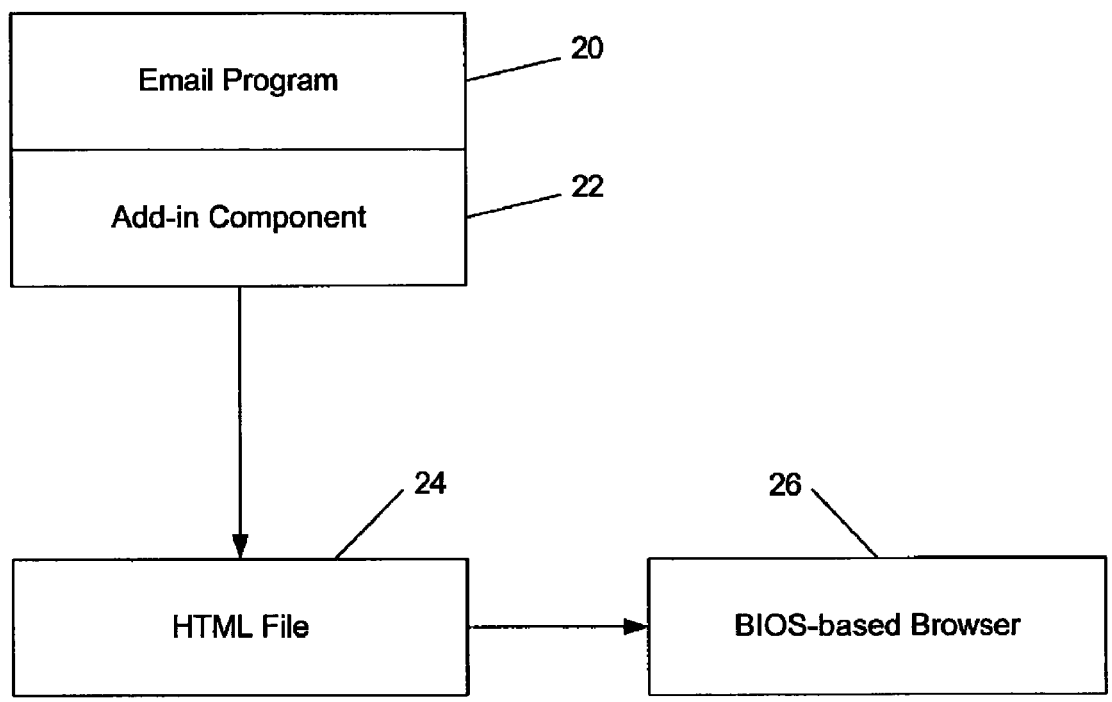
FIG. 2 is a diagram showing the overall software architecture of an exemplary embodiment of the present invention.

FIG. 2 is a diagram showing the overall software architecture of an exemplary embodiment of the present invention. An email program 20 is provided with an add-in component 22, which may be an Inproc Component Object Model ("COM") component. The add-in component 22 monitors certain PIM data and stores it in a file 24, using an industry standard file format such as XML, in a non-volatile memory (such as a flash memory card) when the user's email program is exited or before the computer is powered off or placed in a state of low power consumption. The PIM information captured from the user's email program 20 may be further processed using software protocols such as XSL or Cascading Style Sheet ("CSS") before being stored in the file 24 in a pre-defined format such as HTML format.

A BIOS-based browser 26 is implemented to read PIM data that is stored in the file 24. The non-volatile memory, which stores the file 24, may be accessible within a very short time (a few seconds) after request for information from a user. Thus, the information is available long before the user's computer is fully powered up or awakened from a reduced power state. The user's computer may be set up such that the user can request information from the file 24 by pressing a soft key 16 (FIG. 1) when the computer is in a powered off or low power consumption state.

Microsoft Outlook is an example of an email program that may be used to implement the present invention. If Outlook is used, the interface between the email program 20 and the add-in component 22 may include two-way communication via the Outlook object model. Additionally, the interface in the disclosed embodiments includes IDTExtensibility2 COM interface functionality (see Microsoft Developer Network documentation for more information on the IDTExtensibility2 functionality). The specific details of the interface between the email program 20 and the add-in component 22 are not crucial aspects of the present invention.

Starting with Outlook 2000, Microsoft Corporation introduced the Office Add-In architecture, which allows the development of inproc COM servers that may leverage the object model (consisting of methods and events) of Outlook 2000 or later versions. That object model allows the automation of the functions and features of Outlook. This allows the import/export of information stored in Microsoft Exchange Servers even though the details of the data structures involved are not known.

A COM add-in is a COM component that interacts with Office 2000 applications. COM add-ins must meet two requirements: (1) the add-in must register itself as an Office add-in by setting values in the Microsoft Office section of the Windows registry, and (2) the add-in must implement the IDTExtensibility2 interface. When Microsoft Office invokes the add-in, it may use Office objects to perform actions such as customizing the user interface, creating new documents or creating special rules that evaluate incoming mail messages.

When Outlook (and other Office applications) load, they search for registered in-process components that implement the IDTExtensibility2 COM interface. That interface requires the methods set forth in Table 1:

TABLE 1

| Method Name | Description |
| --- | --- |
| OnConnection | Called when an add-in is connected |
| OnDisconnection | Called when an add-in is disconnected |
| OnAddInsUpdate | Called when the add-ins collection is updated |
| OnStartupComplete | Called when the system has completed starting |

Once loaded, these components can then interact with Outlook using the Microsoft Outlook Object Model. The specific implementation details of the Microsoft Outlook Object Model are not crucial aspects of the invention. Because the Microsoft Object Model is COM-based, any COM-aware language may be used to program the add-in and access the Object Model. Examples of languages that may be used are Microsoft Visual C++ and Microsoft Visual Basic for Applications. The add-in component 22 may be implemented as a dynamic-link library (DLL) but it may also be an executable program file.

Various categories of information that may be made accessible using the BIOS-based browser 26 are set forth below in Table 2:

TABLE 2

| Data Type | Configuration options needed |
| --- | --- |
| Calendar Data | Configuration options for duration. May use a minimum of x number of days prior to current day, and y number of days in future.<br>Notes/Message body - No need to download attachments.<br>Location<br>Time/Duration<br>Meeting Organizer/Attendees (optional) |
| Tasks | Task Heading<br>Start date/Due date/Status/Priority flag |
| Contacts | Name (First, Middle, Last)<br>Name (Display Name)<br>Business Number<br>Cell Phone Number<br>Home Phone Number<br>Email address |
| Mail | Inbox<br>- Number of unread messages.<br>- Number of total messages<br>- Subject line for all messages<br>- Read/Unread flag<br>- Priority flag<br>- From list (email)<br>- To List (email)<br>- cc list<br>- bcc list<br>Outbox<br>Drafts |

Upon startup, the add-in component 22 may extract Outlook information that is currently available and store it in an XML file. XML may be used because of its portability, extensibility, and standards compliance.

Figure 3:
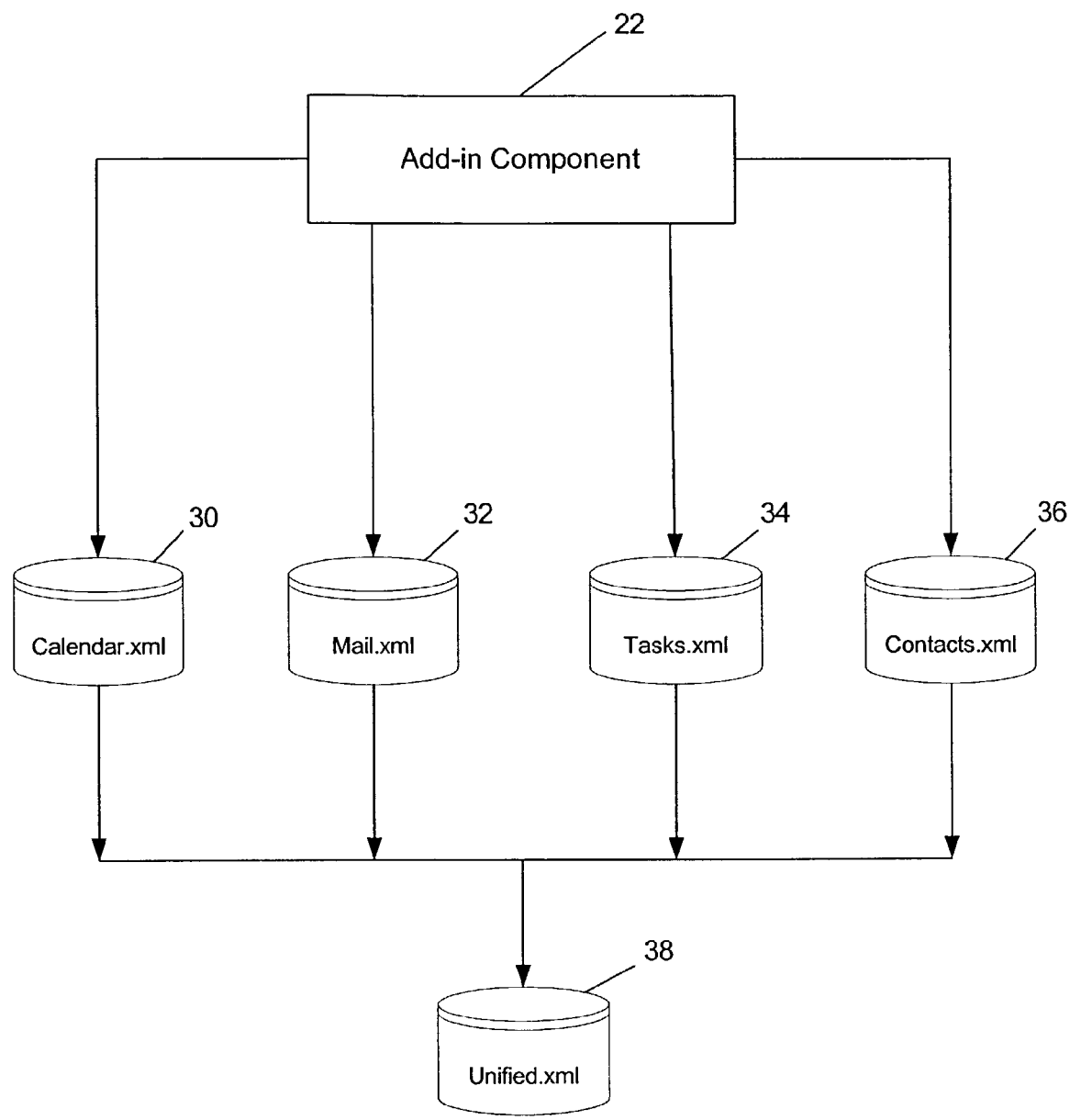
FIG. 3 is a diagram illustrating an XML file hierarchy that may be employed in the present invention.

FIG. 3 is a diagram illustrating an XML file hierarchy that may be employed in the present invention (again, the exact XML schema is not a crucial aspect of the present invention). Information from each of Outlook's functional areas (for example, calendar, tasks, contacts and mail) may be stored in a separate XML file. Examples of these individual files illustrated in FIG. 3 are a calendar.xml file 30, a mail.xml file 32, a tasks.xml file 34 and a contacts.xml file 36. The use of individual files avoids duplication and extra effort when new information in a single category is available. For example, if a new email arrives (or is modified or deleted), only the XML file containing the mail information is updated while the files relating to the other Outlook functional areas are not changed. The specific file names assigned to the files for each functional area are not crucial aspects of the invention.

On the occurrence of individual events, like addition, modification, or deletion of Outlook information, the individual XML files may be updated and/or synchronized to reflect the new information. When system-provided power management wake events occur, the same steps that are performed at start-up should be repeated (see previous paragraph). This will allow synchronization of items missed while the computer is in a state of low power consumption.

Prior to or upon exiting Outlook, or prior to the computer being placed in a low power state such as hibernation, or when a network connection is dropped or added (for example, a RAS connection), all of the individual XML files may be merged into a single unified XML file 38. The unified XML file 38 may employ a name with eight or fewer characters to the left of period followed by up to three characters to the right of the period (an 8.3 filename format) to allow the to be used in non-Windows computing environments. The specific format for individual XML files 30, 32, 34, 36 or the unified XML file 38 is not a crucial aspect of the invention.

In order to decouple and provide maximum amount of leverage for output compatibility, a style sheet (XSL or CSS) may be used to define rules for converting the unified XML file 38 into an HTML file 24 (FIG. 2), which is interpreted by the BIOS-based browser 26 (FIG. 2). This allows multiple opportunities for expandability:

Different style-sheets may be used to perform output as suitable for viewer application. For example, different style sheets may be used to accommodate for differences in Internet Explorer and Netscape Navigator HTML compatibility. In addition, the unified XML file 38 (or individual XML files 30, 32, 34 and 36 may be directly read by support applications such as third party synchronization applications.

Style sheets may be stored in a separate file or could be embedded in the same (merged) XML file. The software developer must accommodate for the syntax differences for the two options, depending on which method is employed. The unified XML file, the XSL style sheet, and the HTML file 24 may all be produced by the add-in component 22, but they do not have to be. For example, the style sheet may be pre-coded and kept separately. The add-in component 22 may merge them or use the MSXML (or other such parsers) to generate the HTML file 24.

The configuration and appearance of the user interface must be taken into account when designing and generating the corresponding style sheet. An influencing factor in developing an appropriate style sheet may be the HTML capabilities of the BIOS-based browser 26 that will access the HTML file 24.

To reduce the complexity and the overhead associated with designing the BIOS-based browser 26 to process XML code and XSL style sheets, the add-in component 22 (FIG. 2) may be designed to produce the final HTML file 24 (FIG. 2), which results from the combination of the unified.xml file 38 (FIG. 3) and the XSL style sheet. The add-in component 22 may accomplish this using any XML/XSL parser. A preferred parser is the MSXML parser, which is built into Windows XP. The add-in component 22 does not have to generate the final HTML file 24 by itself. Instead, the add-in component 22 may be designed to use other options such as spawning external executables to finish the generation of the HTML file 24.

The add-in component 22 may be designed to be an independent or stand-alone piece of code complete with a Windows-based setup and uninstall programs, if desired. The setup program may ensure that it is capable of executing and installing the add-in component 22 anywhere in the system, including a default location such as the non-volatile storage flash volume associated with the host computer. The setup program may be designed to detect whether the add-in component 22 has already been installed and, if so, to exit gracefully without reinstalling the program.

The version of HTML produced by the add-in component 22 may be matched with the level of HTML compatibility that the BIOS-based browser 26 supports. In order to accommodate cycling through data that might not all fit onto one HTML screen, the resulting HTML may include scripting code. The inclusion of scripting code may be avoided if the user interface is designed to use web controls that allow built in navigation (for example, a list box as built in support for sliders, etc.).

The BIOS-based browser 26 may also support frames to logically and physically separate different categories of the PIM data on the display screen. Alternatively, the BIOS-based browser 26 may incorporate CSS for transforming the XML in the supported HTML format. If the BIOS-based browser 26 is designed to support XML and CSS, the HTML need not be generated because the BIOS-based browser 26 could generate it from the unified.xml file 38. In the illustrated embodiment, the PIM viewer may be accessed in a non-Windows environment (i.e. when the computer is not powered on). Thus, the BIOS-based browser 26 may support the level of HTML in which the HTML file 24 is created. The BIOS-based browser 26 may additionally support the Double Byte Character Set ("DBCS") to allow support of international languages.

A protocol may be established to determine the default home page the BIOS-based browser 26 navigates to upon launch. The BIOS-based browser 26 may support a command line option to accept an HTML file that the BIOS-based browser 26 may navigate to upon launch. This functionality may be in addition to a protocol that allows changing of the default home page through programming.

The BIOS-based browser 26 may be implemented to support basic graphic file formats natively. These file formats may include JPEG, Gif, and bitmaps, with color depths of 16,256 and 64K color. Additionally, the BIOS-based browser 26 may provide basic browser-based controls for basic navigation. Such controls may include: Stop, Refresh, Back, Forward and the like.

Figure 4:
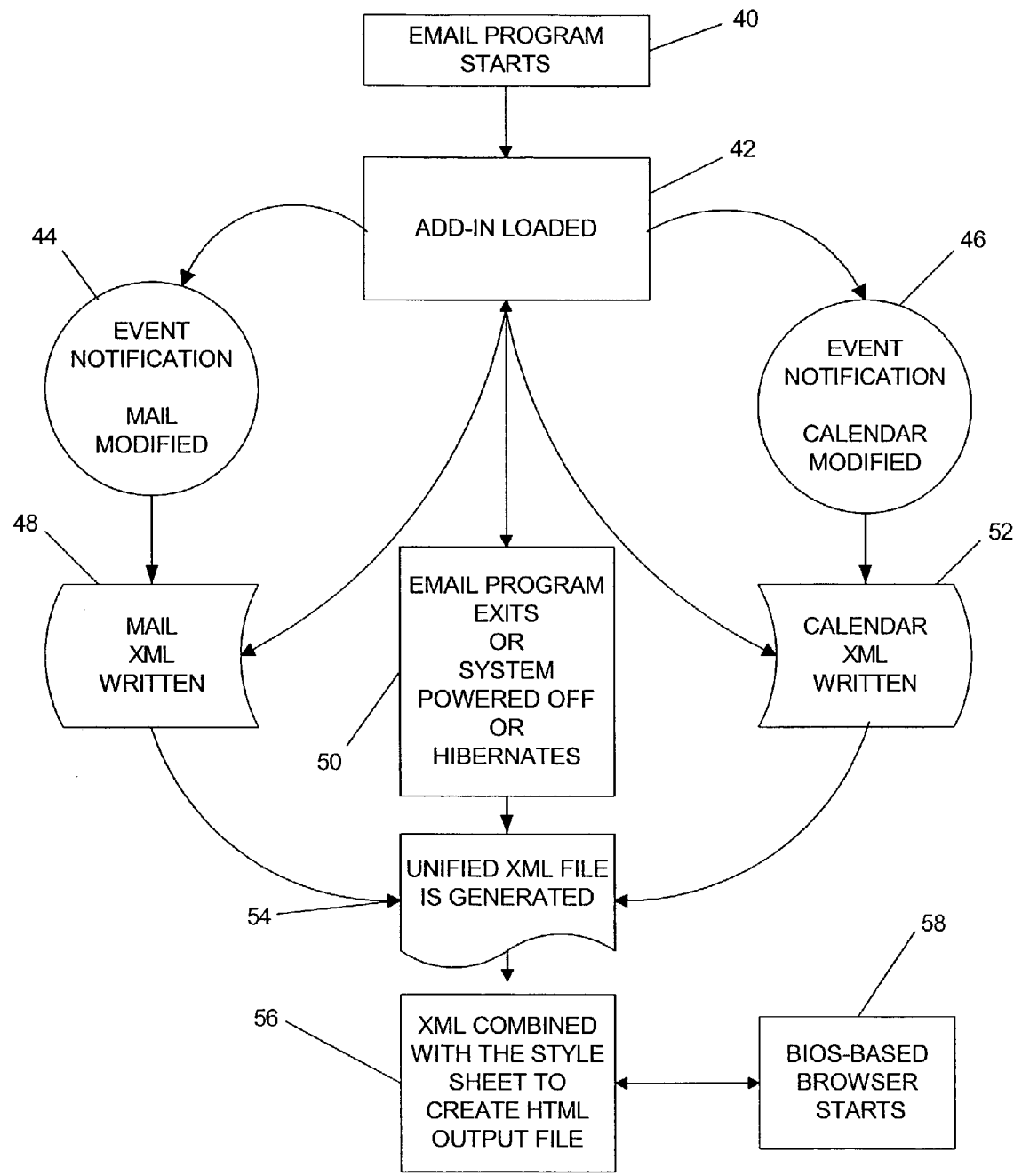
FIG. 4 is a flow diagram illustrating the operation of an exemplary embodiment of the present invention.

FIG. 4 is a flow diagram illustrating the operation of an exemplary embodiment of the present invention. At 40, the user's computer is powered on and the user's email program is initiated. The entries in the email portion of the computer's registry cause the add-in component 22 (FIG. 2) to be loaded. In response to the loading of the add-in component 22, the individual XML files corresponding to the functional areas of the email programming that collect PIM data are written or updated as shown at 48, 52. The unified.xml file 38 (FIG. 3) is updated as shown at 54. As shown at 50, the unified.xml file 38 may also updated when the email program exits or upon system power off or entry of the system into a state of low power consumption such as hibernation.

The information contained in the unified.xml file 38 is processed with a style sheet and the results written into the HTML file 24 (FIG. 2). The data stored in the HTML file 24 is accessed by the BIOS-based browser, as shown at 58.

At 44, 46 examples of changes to a user's PIM data are depicted. The example shown at 44 depicts a change to the user's mail data and the example 46 depicts a change to the user's calendar data. Changes such as those depicted at 44, 46 could occur with respect to any of the email functional areas supported by a given embodiment of the invention (e.g. contacts and task lists as well as email and calendar data). The changes at 44, 46 are captured and result in corresponding writes to the XML files that store the data for the system components that have changed. For example, 48 depicts a change to the mail.xml file 32 (FIG. 3) and 52 depicts a change to the calendar.xml file (30 (FIG. 3). Changes to the individual XML files are aggregated into the unified.xml file 38 (FIG. 3).

When the user's computer is powered off or otherwise in a state of low power consumption, the user may choose to access the information stored in the HTML file 24. This access may be accomplished by pressing a soft key 16 (FIG. 1) on the exterior of the user's computer 10 to invoke the BIOS-based browser 26. When the BIOS-based browser 26 is invoked, it loads and displays the latest PIM information stored in the HTML file 24 without powering on the computer 10 or awakening it from a low power display. The information stored in the HTML file 24 may thus be made available to the user much faster than if the user had to wait for the system to power up or awaken from a low power state. The BIOS-based browser 26 may include functionality to very quickly display a sign or indication that it has been launched and is loading the requested PIM data. The BIOS-based browser may display the first fully rendered page based on the HTML file 24 within about 3 seconds (or less) from the time the user first invokes it.

When the user is finished using the PIM information, he/she may exit the BIOS-based browser 26, for example, by pressing (toggling) the same soft key 16HW button. The user may also be able to exit the BIOS-based browser 26 by clicking on a control element displayed by the BIOS-based browser 26. When the BIOS-based browser is exited, the computer system need not be booted.

The BIOS-based browser 26 may be programmed to display error messages to the user based on certain conditions of the system. Examples of such error messages may include indications that no HTML file could be found or that no non-volatile memory storage (flash) is available to the BIOS-based browser 26 and the like. The specific conditions that generate these messages and the content of the messages themselves are not crucial aspects of the invention.

During the exit or shutdown process of Outlook, accurate updates may not be obtainable through Outlook's object model. Accordingly, it may be necessary to rely on data gathered from Outlook object model event notifications to update individual data categories.

The present invention may be employed if multiple users share the same computer (i.e. the PIM application on the computer is configured with multiple user accounts). To implement the invention in a multiple user environment, the xml files 30, 32, 34, 36 and 38 (FIG. 3) and the HTML file 24 (FIG. 2) may be set up to handle each user's PIM data separately. The user interface presented by the BIOS-based browser 26 (FIG. 2) may also be designed to support a multiple user environment.

The user data stored in the HTML file does not necessarily have to be PIM data. It could be any type of data that the user desires to access in a rapid manner when his/her computer is powered down or otherwise in a state of low power consumption. For example, the user data may be web pages that were browsed by the user when the computer was powered up. Those pages may be stored in the HTML file 24 (FIG. 2) for later access by the BIOS-based browser 26 (FIG. 2).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for providing rapid access to data, comprising:
one or more storage devices connected through one or more electrical paths to a processor;
a software component that is configured to operate in a primary operating environment and to execute on a host system by the processor and to collect user data when an application program is executing on the host system and store the user data in a storage device from the one or more storage devices; and
a browser that is configured to operate in a second operating environment and to read the user data stored in the storage device while the host system is in an off state or hibernation state, and while the storage device is connected to the one or more electrical paths, wherein the browser is configured to provide access to the user data in hypertext markup language (HTML) format that includes personal information manager (PIM) data when operating in the second operating environment which is different than the primary operating environment, wherein the browser is configured to provide access to the user data in hypertext markup language (HTML) format that includes personal information manager (PIM) data when operating in the second operating environment which is different than the primary operating environment.

2. The system set forth in claim 1 wherein the browser is adapted to read the user information from flash memory in the storage device while the host system is in the off state.

3. The system set forth in claim 1 wherein the software component is adapted to collect a plurality of types of user data and store the user data of each type in a different file that is accessible while the host system is in the off state.

4. The system set forth in claim 3 wherein the system is adapted to process the stored user data using a style sheet for storage in a file that is accessible while the host system is in the off state.

5. The system set forth in claim 3 wherein one of the plurality of types of user data is calendar data.

6. The system set forth in claim 3 wherein one of the plurality of types of user data is email data.

7. The system set forth in claim 3 wherein one of the plurality of types of user data is task data.

8. The system of claim 1, where the browser is configured to read the user data via a Basic Input/Output System (BIOS) of the host system while an operating system of the host system is not active.

9. The system set forth in claim 1 wherein the user data is stored on the storage device in HTML format.

10. The system set forth in claim 1 wherein the browser is a BIOS-based browser.

11. The system set forth in claim 1 wherein the browser is adapted to read the user data stored in the storage device while the host system is in a state of reduced power consumption.

12. A computer system that is configured to execute an application program and to be placed in an off state and a hibernation state, the computer system comprising:
a software component that is configured to operate in a primary operating environment and to execute on the computer system and to collect user data when the application program is executing on the computer system and store the user data in a storage device; and
a browser that is configured to operate in a secondary operating environment and to read the user data stored in the storage device while the computer system is in the off state or the hibernation state, wherein the browser is configured to provide access to the user data in hypertext markup language (HTML) format that includes personal information manager (PIM) data when operating in the second operating environment which is different than the primary operating environment.

13. The computer system set forth in claim 12 wherein the browser is adapted to read the user information from flash memory in the storage device while the computer system is in the off state and while the computer system is in the hibernation state.

14. The computer system set forth in claim 12 wherein the software component is adapted to collect a plurality of types of user data and store the user data of each type in a different file that is accessible while the computer system is in the off state and while the computer system is in the hibernation state.

15. The computer system set forth in claim 14 wherein the system is adapted to process the stored user data using a style sheet.

16. The computer system set forth in claim 14 wherein one of the plurality of types of user data is calendar data.

17. The computer system set forth in claim 14 wherein one of the plurality of types of user data is email data.

18. The computer system set forth in claim 14 wherein one of the plurality of types of user data is task data.

19. The computer system set forth in claim 14 wherein one of the plurality of types of user data is calendar contact.

20. The computer system set forth in claim 12 wherein the user data is stored on the storage device in HTML format.

21. The computer system set forth in claim 12 wherein the browser is a BIOS-based browser.

22. A computing device comprising:
an enclosure containing a processing system comprising:
at least one processor;
at least one storage device connected to one or more electrical paths for communicating signals therebetween;
at least one application program executable in a primary operating environment by the at least one processor that when executed, collects and stores user data in the at least one storage device; and
a browser configured to operate in a secondary operating environment and to read the user data stored in the at least one storage device while the computing device is in an off state or a hibernation state, wherein the browser is configured to provide access to the user data in hypertext markup language (HTML) format that includes personal information manager (PIM) data when operating in the second operating environment which is different than the primary operating environment.

23. The computing device of claim 22, where the at least one storage device comprises a non-volatile memory.

24. The computing device of claim 22 where the browser is a BIOS-based browser.

25. The computing device of claim 22 where the browser is configured to read the user data while the at least one storage device is connected to the one or more electrical paths in the enclosure.

* * * * *